UNITED STATES PATENT OFFICE.

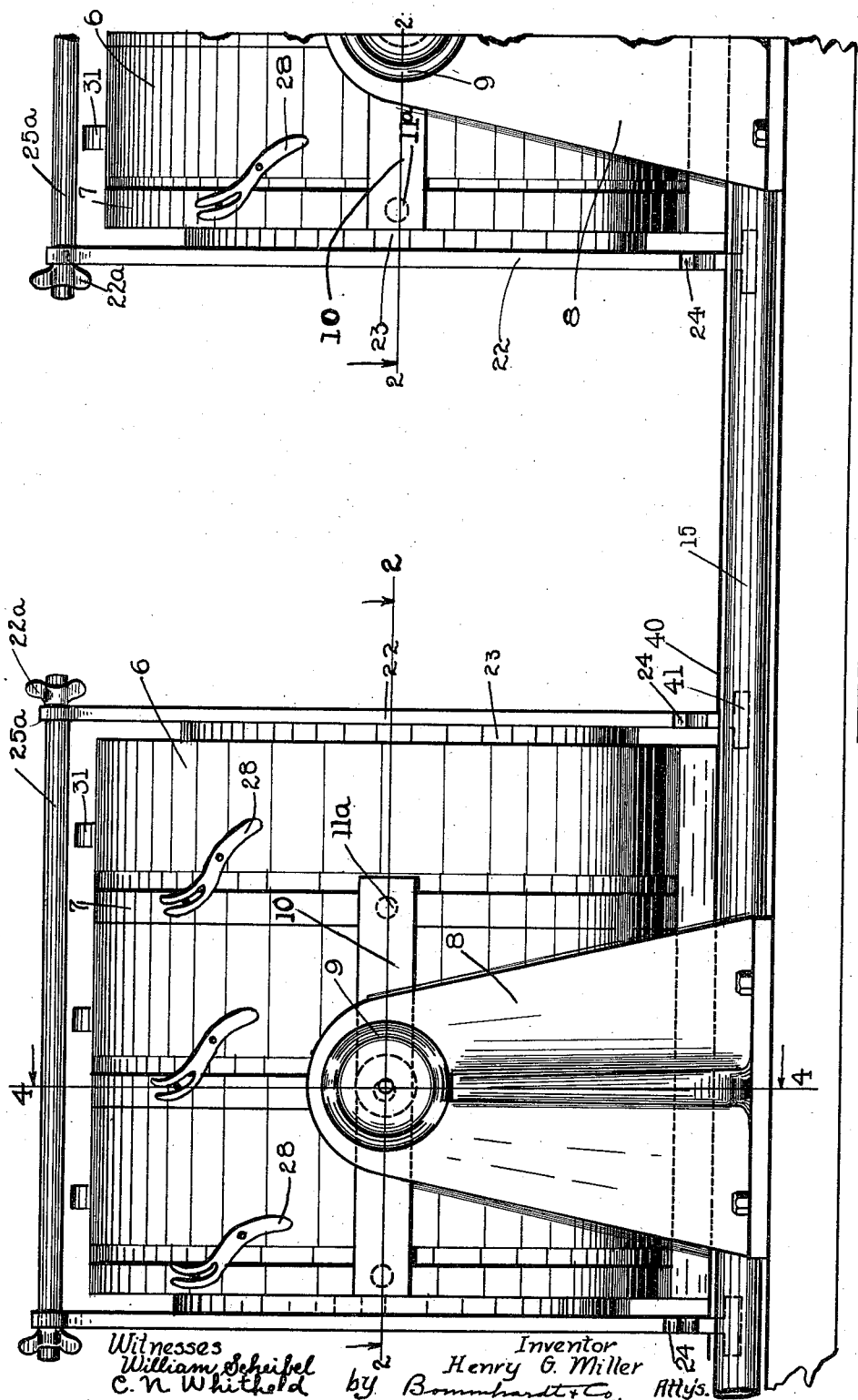

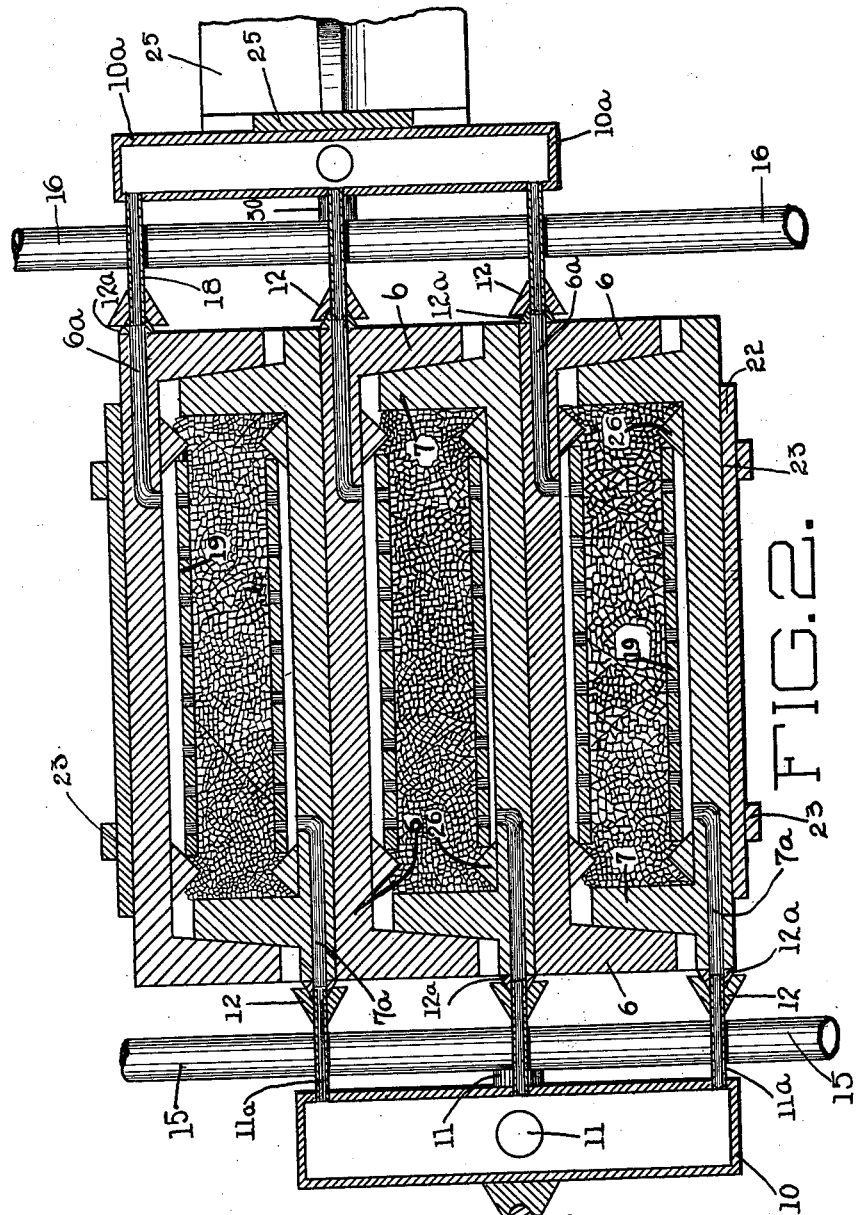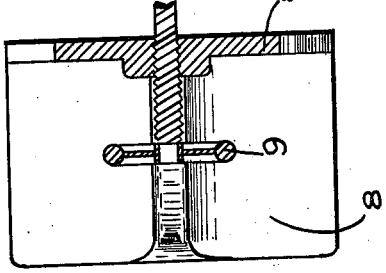

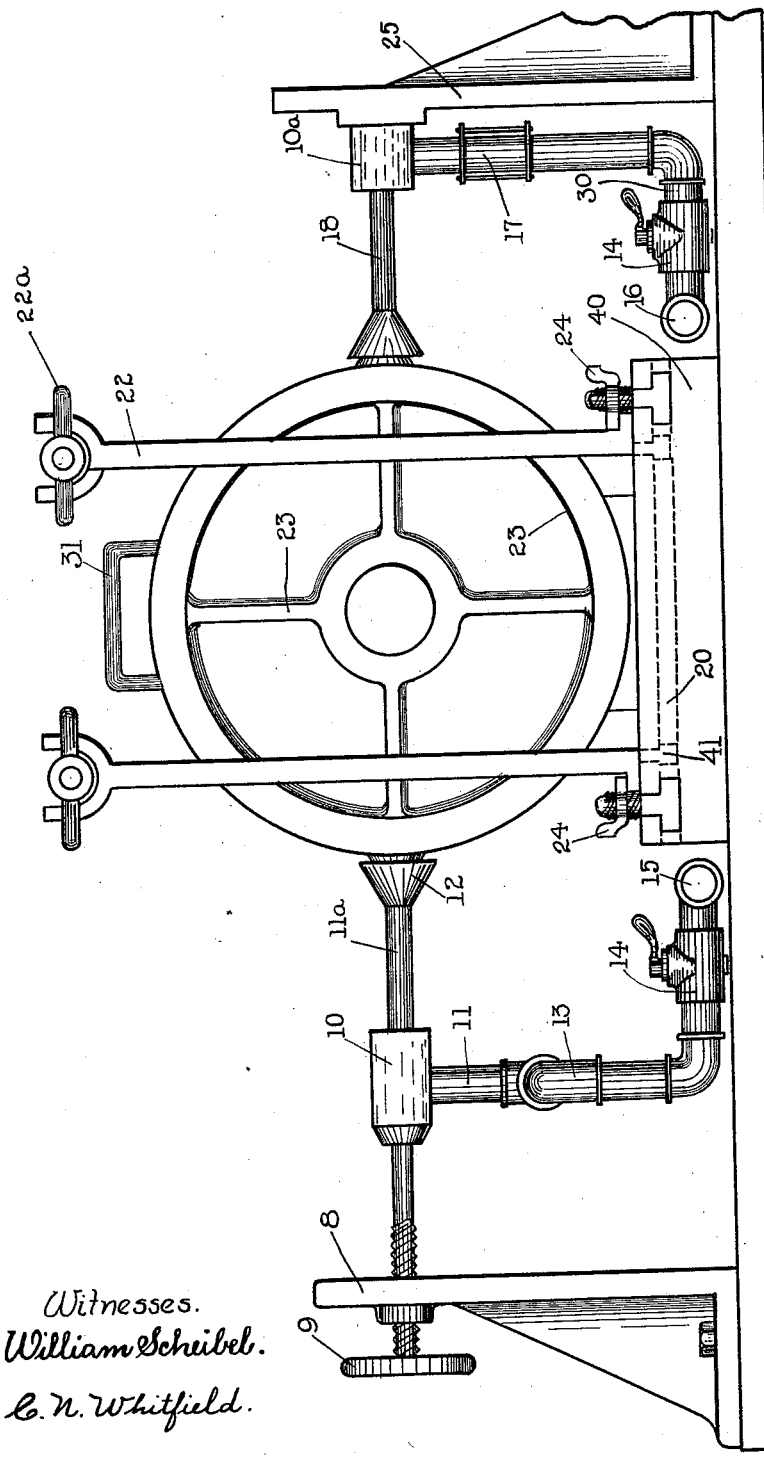

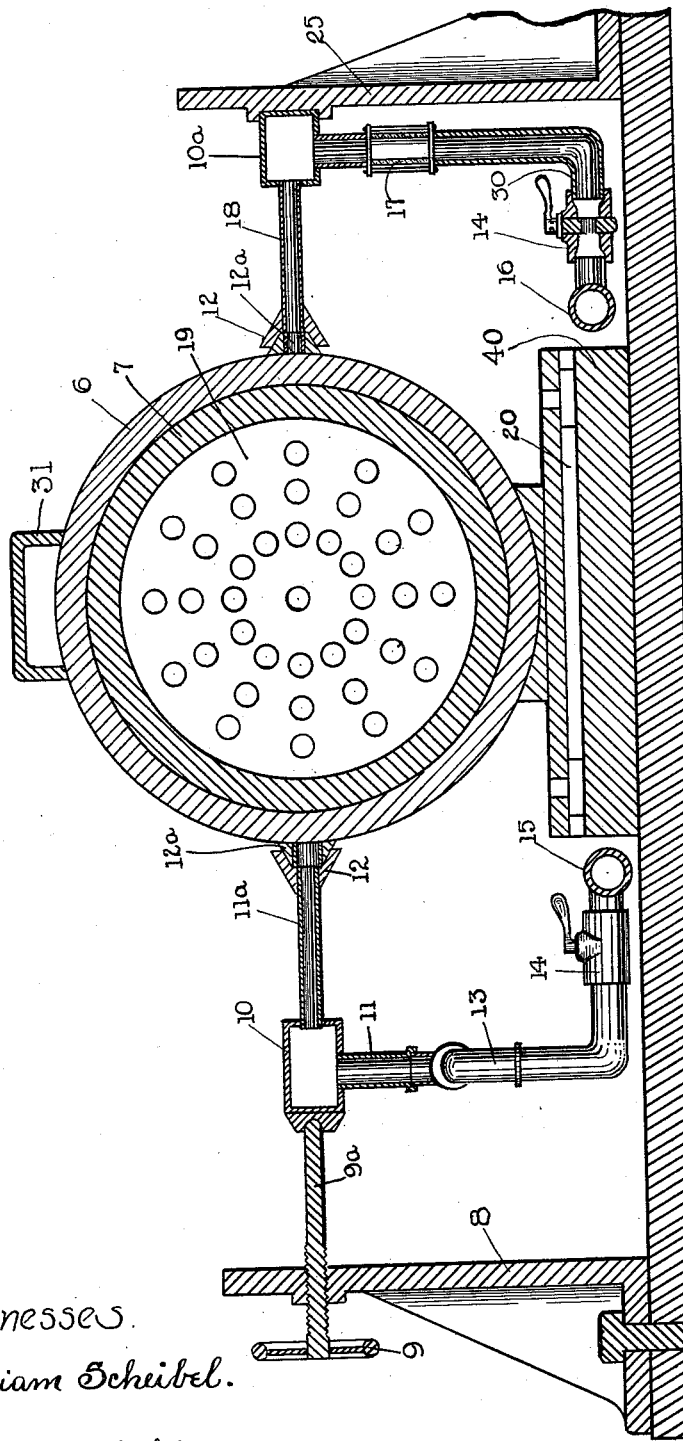

HENRY G. MILLER, OF CLEVELAND, OHIO, ASSIGNOR OF ONE-HALF TO S. S. NEWMAN, OF PITTSBURGH, PENNSYLVANIA.

FILTER SYSTEM.

1,013,419. Specification of Letters Patent. Patented Jan. 2, 1912.

Application filed May 4, 1911. Serial No. 625,028.

*To all whom it may concern:*

Be it known that I, HENRY G. MILLER, citizen of the United States, residing at Cleveland, in the county of Cuyahoga and State of Ohio, have invented certain new and useful Improvements in Filter Systems, of which the following is a specification.

This invention relates to filter systems, and especially to pressure filter systems of that type embodying a number of filter units through which the liquid to be filtered is forced from an inlet main to an outlet main.

The object of the invention is to provide a system in which the units can be readily attached or detached, or cut out of the system for the purpose of cleaning or otherwise.

A further object of the invention is to provide improved means for inclosing the filter mass in each unit, and for clamping the parts of the units together. The arrangement is such that the various units or cells may be taken out without affecting or disturbing the remaining cells.

A further object of the invention is to provide improved means for connecting the mains to the respective cells.

With these and other objects in view the invention is hereinafter described and illustrated in the accompanying drawings in which—

Figure 1 is a side elevation of the filter system, one set of cells being removed. Fig. 2 is a section on the line 2—2 of Fig. 1. Fig. 3 is an end elevation. Fig. 4 is a section on the line 4—4 of Fig. 1.

Referring specifically to the drawings each cell consists of an outer cup-shaped plate or casing 6 and an opposite cup shaped plate or casing 7, the flange of the latter fitting within the flange of the former, the joint between the flanges being a tapered one, as shown in Fig. 2. These casings are preferably circular in shape, and the outer casing has a handle 31 at the top, by means of which the cell may be lifted. The joint is tapered in order to provide a tight fit when the casings are clamped together.

The system comprises a plurality of sets, and each set comprises a plurality of cells, preferably three, as shown in the drawings, and the cells are adapted to fit one against the other, in each set, each cell having a connection to the inlet and outlet mains, as hereinafter described. Each cell has a perforated plate 19 adjacent the respective sides thereof, said plate resting against a rib 26 which serves to space the plate slightly from the wall of the cell. Cored in each casing 6 is a passage 6$^a$, communicating with the space behind the plate 19, and cored in each casing 7 is a passage 7$^a$ communicating with the space behind the opposite plate 19. Each of the passages 6$^a$ and 7$^a$ terminates in a tapered nipple 12$^a$ at the periphery of the casing. On the inlet side these nipples provide means for the attachment of the pipes 11$^a$ by means of conical sockets 12 at the ends of said pipes into which sockets the nipples fit, and the pipes 11$^a$ of each set communicate with a box 10 which may be pressed toward the cells by means of a screw 9 working through a standard 8. The inlet box 10 is connected by a pipe 11 to the supply main 15 which extends along the whole battery or system of filters and has branches corresponding to the various sets. The pipe 13 has therein a valve 14 and also a swinging elbow joint 13 which is necessary in order to permit the movement incident to the action of the screw as the box 10 is advanced toward or retracted from the cells. The flexible elbow joint permits the box to be set up or backed off, without disconnecting the pipe 11. On the outlet side a somewhat similar structure is provided. That is the nipples 12$^a$ at the end of the passages 6$^a$ are connected by similar sockets to pipes 18 which lead to the outlet box 10$^a$, and this abuts or rests against the fixed abutment 25; and when the screw 9 is tightened up with the cells in position all the joints are made, on both sides of the cells. The outlet box 10$^a$ is connected by a pipe 30 to the outlet main 16, the pipe having a glass section 17 to observe the flow and also a valve 14 to control the same.

The respective cells of each set are clamped together and held in position by means of disks 23 placed against the ends of the respective sets of cells and connected by bolts 25$^a$ engaging the extended standards or bars 22 which are integral with the disks 23, which are held by the nuts 22$^a$ on the bolts 25ª. The lower ends of the bars 22 have angular feet which rest on the base block 40, where they are clamped by the clamps 24, and also have projections 41 which fit in the T-slots 20 in said base block, said T-slots extending transversely to permit any movement essential to making the pipe connections, as above described, by means of the screw 9. For locking the casings of each cell together locking devices 28 are provided.

In order to remove any set of cells, the screw 9 is backed off until the nipples 12ª are loosened from the sockets 12, and the inlet box 10 can then be pulled outwardly, this action being permitted by the swivel joint 13, permitting complete disengagement of the nipples 12ª; and the cells of the set can then be lifted out by the handles 31, the bolts 25, of course, being first removed. Then another set of cells can then be quickly set in place, and by setting up the screw 9 the connections will be made as formerly. One set of cells can be cut out or left out, as shown in Fig. 1, and any desired number of cells can be used by proper manipulation of the valves 14.

It is very desirable in filter systems of this kind to provide means whereby the individual cells can be quickly removed, because they have to be repacked and cleaned, quite frequently, and the apparatus above described enables this to be done quickly and easily.

Having thus described my invention, what I claim as new and desire to secure by Letters Patent is:—

1. A filter comprising a plurality of cells, inlet and outlet boxes detachably connected to opposite sides of said cells respectively and inlet and outlet mains connected to said boxes.

2. A filter comprising a plurality of cells, and inlet and outlet boxes respectively communicating with said cells, the cells and boxes being movable relatively to each other, to connect or disconnect the same.

3. A filter comprising a cell with inlet and outlet passages, and inlet and outlet pipes having slip joints with said passages, the pipes and cell being movable toward and from each other, to make or break the joints.

4. A filter comprising a cell with inlet and outlet passages terminating in nipples, and inlet and outlet pipes having slip joints with said nipples, the cell and pipes being relatively movable, to make or break the joints.

5. A filter comprising a plurality of cells standing side by side, said cells having inlet and outlet passages, and inlet and outlet boxes located at opposite sides of said cells, said boxes being provided with pipe sections having slip joints with said passages, the boxes and cells being relatively movable to make or break said joints.

6. A filter comprising a plurality of cells having inlet and outlet passages terminating in nipples at opposite sides of said cells, outlet and inlet boxes located at opposite sides of the cells, pipe sections extending from the boxes and having sockets adapted to fit the nipples, to connect the boxes to the cells, and means to relatively move the boxes and cells to engage the sockets with the nipples, or to disengage the same.

7. A filter comprising a plurality of cells with inlet and outlet passages opening at opposite sides thereof, inlet and outlet boxes located respectively at opposite sides of the cells, and having slip connections with said passages, and inlet and outlet mains connected to said boxes, the connection between one main and one box being flexible to permit the box to be moved relative to the cells.

8. The combination with a filter cell and a main, of a pipe connection between the main and the cell, said pipe having a slip joint with the cell and also having a flexible joint therein, permitting movement of a section of the pipe to connect or disconnect the same with the cell.

9. A filter comprising a plurality of cells having inlet and outlet passages, an outlet main connected to the outlet passages, and an inlet main and connections between the inlet main and the inlet passages, said connections including an inlet box and a flexible connection between the box and the main.

10. A filter comprising a cell having inlet and outlet passages at opposite sides thereof, inlet and outlet boxes having slip connections with said passages, an abutment supporting one of the boxes, and a screw bearing against the other box and adapted to relatively move the boxes and cell to close said connections.

11. A filter comprising a plurality of cells having inlet and outlet passages at opposite sides thereof, inlet and outlet boxes located respectively at opposite sides of the cells and having slip connections with said passages, an abutment against which one of the boxes rests, and a screw bearing against the other box and adapted to force the box and cells toward each other to close the said connections.

12. A filter comprising a pair of imperforate casings with flanges fitting one within the other, and forming a cell closed at opposite ends, a perforated plate spaced from each casing, said plates being located opposite to each other within the casings, and each casing having a passage therein communicating with the space between the plate and the end of the casing, and a filter mass between the plates.

13. A filter comprising a plurality of sets of cells, inlet and outlet mains and connections between the mains and the cells of each set, said connections including a box having a branch pipe connected to each cell of the set.

14. A filter comprising a plurality of sets of cells, inlet and outlet mains and connections between the mains and the cells of each set, said connections including a box having a branch pipe connected to each cell of the set, the box being individually movable with respect to the set, whereby any set of cells can be disconnected and removed.

In testimony whereof, I do affix my signature in presence of two witnesses.

HENRY G. MILLER.

Witnesses:
JOHN A. BOMMHARDT,
STEDMAN J. ROCKWELL.

Copies of this patent may be obtained for five cents each, by addressing the "Commissioner of Patents, Washington, D. C."